US012614482B2

(12) United States Patent
DeMerchant et al.

(10) Patent No.: US 12,614,482 B2
(45) Date of Patent: Apr. 28, 2026

(54) TELEVISION SURROUND LIGHTING

(71) Applicant: Sony Group Corporation, Tokyo (JP)

(72) Inventors: Marvin DeMerchant, San Diego, CA (US); Tracy Barnes, San Diego, CA (US); Stephanie Mitchener, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 431 days.

(21) Appl. No.: 18/131,115

(22) Filed: Apr. 5, 2023

(65) Prior Publication Data

US 2024/0339057 A1 Oct. 10, 2024

(51) Int. Cl.
| | |
|---|---|
| *G09G 3/00* | (2006.01) |
| *G09G 5/12* | (2006.01) |
| *H04N 7/00* | (2011.01) |
| *H05B 47/11* | (2020.01) |

(52) U.S. Cl.
CPC .............. *G09G 3/003* (2013.01); *G09G 5/12* (2013.01); *H04N 7/002* (2013.01); *H05B 47/11* (2020.01)

(58) Field of Classification Search
CPC .. G09G 3/003; G09G 5/12; G09G 2320/0613; G09G 2320/0666; H04N 7/002; H04N 5/58; H04N 21/4131; H04N 21/4312; H04N 21/44008; H04N 21/44218; H04N 21/42202; H05B 47/11; H05B 45/20; H05B 47/165; H05B 47/155; G06F 3/1423
See application file for complete search history.

(56) References Cited

U.S. PATENT DOCUMENTS

| | | | | |
|---|---|---|---|---|
| 7,369,903 | B2 * | 5/2008 | Diederiks | ........ H04N 21/43615 |
| | | | | 700/28 |
| 7,864,204 | B2 * | 1/2011 | Overes | ................... H05B 47/11 |
| | | | | 345/82 |
| 8,174,488 | B2 * | 5/2012 | Kadijk | ..................... H04N 9/73 |
| | | | | 348/844 |
| 9,480,907 | B2 | 11/2016 | Benko | |
| 10,917,683 | B2 * | 2/2021 | Reichow | .............. H04N 9/3147 |
| 11,606,853 | B2 * | 3/2023 | Huang | ................. H04N 19/186 |
| 11,887,251 | B2 * | 1/2024 | Jutan | .................... G09G 3/2003 |
| 11,978,154 | B2 * | 5/2024 | Jutan | ..................... H05B 45/20 |
| 2010/0020251 | A1 | 1/2010 | Kadijk | |
| 2010/0110000 | A1 * | 5/2010 | De Greef | .............. H05B 47/11 |
| | | | | 315/294 |
| 2011/0115979 | A1 | 5/2011 | Aoki | |
| 2025/0151187 | A1 * | 5/2025 | Mouilleseaux | .... H05B 47/1975 |

FOREIGN PATENT DOCUMENTS

CN 215341394 U 12/2021

OTHER PUBLICATIONS

Anonymous: "Ambilight—Wikipedia", Sep. 21, 2016 (Sep. 21, 2016), XP055471694.

* cited by examiner

*Primary Examiner* — Vijay Shankar

(74) *Attorney, Agent, or Firm* — Trellis IP Law Group, PC

(57) ABSTRACT

Implementations generally relate to the television viewing experience. In some implementations, a method includes detecting a program being presented on a television. The method further includes determining content of the program, where the content is displayed on a screen of the television. The method further includes displaying light on a wall behind the television based on the content being presented.

18 Claims, 3 Drawing Sheets

100

100

Detect a program being presented on a television _202_

Determine content of the program, wherein the content is displayed on the screen of the television _204_

Display light on a wall behind the television based on the content being presented _206_

300

TELEVISION SURROUND LIGHTING

BACKGROUND

When users watch television, the television viewing experience involves the user watching what is displayed on the television screen. The television is typically disconnected from the room lighting. As such, the room lighting is typically not a part of the viewing experience.

SUMMARY

Implementations generally relate to the television viewing experience. In some implementations, a system includes one or more processors, and includes logic encoded in one or more non-transitory computer-readable storage media for execution by the one or more processors. When executed, the logic is operable to cause the one or more processors to perform operations including: detecting a program being presented on a television; determining content of the program, where the content is displayed on a screen of the television; and displaying light on a wall behind the television based on the content being presented.

With further regard to the system, in some implementations, the content includes colors. In some implementations, the logic when executed is further operable to cause the one or more processors to perform operations including displaying light on a plurality of walls surrounding the television. In some implementations, the light being displayed on the wall originates from a rear of the television. In some implementations, the light displayed on the wall expands a visual experience of the user while the user watches the program. In some implementations, the logic when executed is further operable to cause the one or more processors to perform operations including: detecting other lights in a room in which the television is presenting the program; and displaying the light on the wall behind the television based at least in part on the other lights in the room. In some implementations, the logic when executed is further operable to cause the one or more processors to perform operations including presenting one or more audio sounds associated with the light being displayed on the wall.

In some implementations, a non-transitory computer-readable storage medium with program instructions thereon is provided. When executed by one or more processors, the instructions are operable to cause the one or more processors to perform operations including: detecting a program being presented on a television; determining content of the program, where the content is displayed on a screen of the television; and displaying light on a wall behind the television based on the content being presented.

With further regard to the computer-readable storage medium, in some implementations, the content includes colors. In some implementations, the instructions when executed are further operable to cause the one or more processors to perform operations including displaying light on a plurality of walls surrounding the television. In some implementations, the light being displayed on the wall originates from a rear of the television. In some implementations, the light displayed on the wall expands a visual experience of the user while the user watches the program. In some implementations, the instructions when executed are further operable to cause the one or more processors to perform operations including: detecting other lights in a room in which the television is presenting the program; and displaying the light on the wall behind the television based at least in part on the other lights in the room. In some implementations, the instructions when executed are further operable to cause the one or more processors to perform operations including presenting one or more audio sounds associated with the light being displayed on the wall.

In some implementations, a method includes: detecting a program being presented on a television; determining content of the program, where the content is displayed on a screen of the television; and displaying light on a wall behind the television based on the content being presented. With further regard to the method, in some implementations, the content includes colors. In some implementations, the method further includes displaying light on a plurality of walls surrounding the television. In some implementations, the light being displayed on the wall originates from a rear of the television. In some implementations, the light displayed on the wall expands a visual experience of the user while the user watches the program. In some implementations, the method further includes: detecting other lights in a room in which the television is presenting the program; and displaying the light on the wall behind the television based at least in part on the other lights in the room. In some implementations, the method further includes presenting one or more audio sounds associated with the light being displayed on the wall.

A further understanding of the nature and the advantages of particular implementations disclosed herein may be realized by reference of the remaining portions of the specification and the attached drawings.

DETAILED DESCRIPTION

Implementations generally relate to the television viewing experience. As described in more detail herein, in various implementations, a system detects a program being presented on a television. The system further determines the content of the program, where the content is displayed on the screen of the television. The system further displays light on a wall behind the television based on the content being presented. By casting light on the wall behind the television and optionally on other walls of the room, the system extends the viewing experience into the room around the television and optionally surrounding the viewer with the light.

Figure 1:
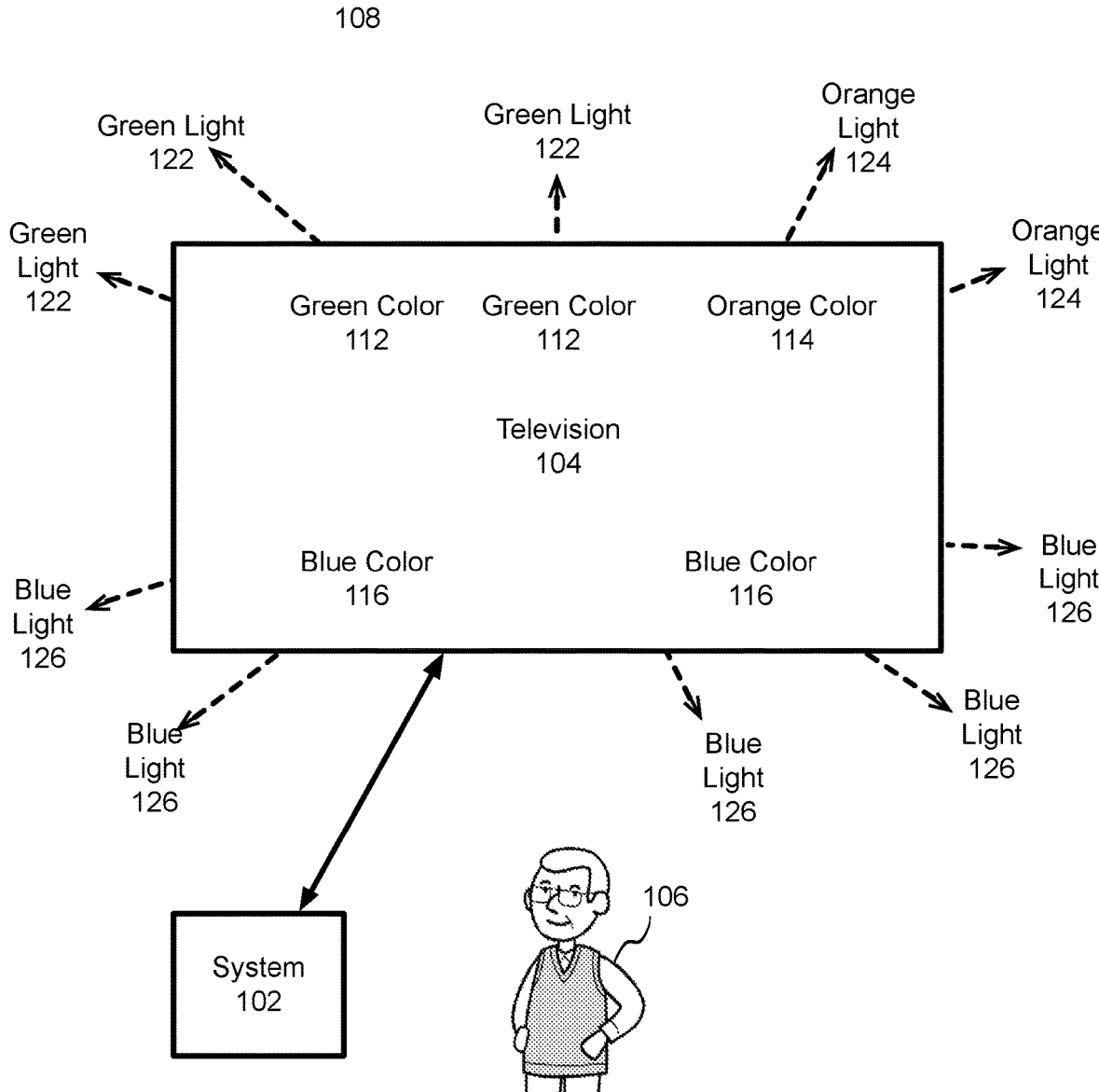
FIG. 1 is a block diagram of an example environment for enhancing the television viewing experience, which may be used for implementations described herein.

FIG. 1 is a block diagram of an example environment 100 enhancing the television viewing experience, which may be used for some implementations described herein. As shown, in various implementations, environment 100 includes a system 102 and a television 104. System 102 and television 104 may communicate directly via any suitable means such as a network (not shown) such as a Bluetooth network, a Wi-Fi network, etc. While system 102 and television 104 are shown separately, in some implementations, system 102 may be integrated with television 104.

As shown in FIG. 1 and described in more detail herein, system 102 extends the television picture beyond the television frame into the room. The system achieves this by using an array or grid of lights on the television. In various implementations, the light grid is behind the television and casts light onto the wall behind the television. In some implementations, the television may have a light grid or a light strip of lighting embedded or placed on television 104. The lights light up around the television making the television image appear to extend beyond television 104.

In the example implementation shown, the array of lights may be on the sides of the television to cast light onto the walls to the side of the television. As shown, television 104 has green color 112, orange color 114, and blue color 116. These colors may be general colors on the screen among other colors. For example, green color 112 may represent trees or foliage in the background. Orange color 114 may represent the sun. Blue color 116 may represent a body of water such a lake or pond, etc. Further implementations directed to the lighting aspects are described in more detail below.

While the example shown involves an array of lights displaying lights on the wall behind the television, in various implementations, different lights may be on other sides of the television. For example, in some implementations, the array of lights may be on the sides of the television to cast light onto the walls to the side of the television. In various implementations, the array of lights may be on the top the television to cast light onto the ceiling above the television.

In various implementations, environment 100 may not have all of the components shown and/or may have other elements including other types of elements instead of, or in addition to, those shown herein.

While system 102 performs implementations described herein, in other implementations, any suitable component or combination of components associated with system 102 or any suitable processor or processors associated with system 102 may facilitate performing the implementations described herein.

In various implementations, any neural networks and/or blockchain networks associated with system 102 may also facilitate performing the implementations described herein. For example, the system may perform various operations associated with implementations described herein using a neural network (not shown). The system may process any collected information through the neural network, which adapts or learns based on the collected information. The neural network may also be referred to as an artificial intelligence neural network or neural net. Example implementations directed to AI, machine learning, and neural networks are described in more detail herein.

Figure 2:
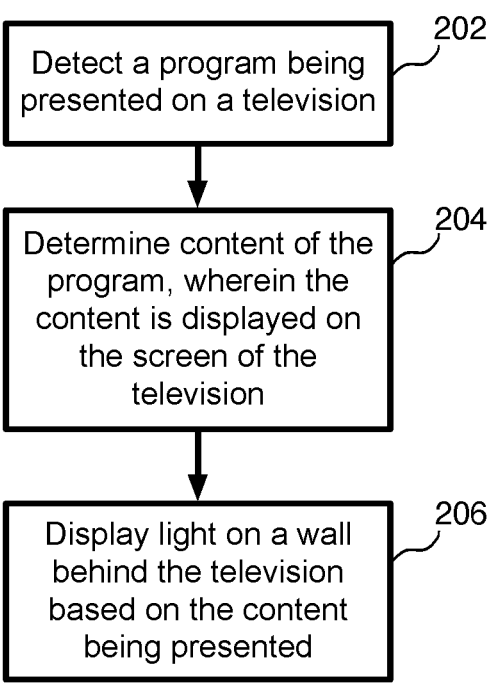
FIG. 2 is an example flow diagram for enhancing the television viewing experience, according to some implementations.

FIG. 2 is an example flow diagram for enhancing the television viewing experience, according to some implementations. Referring to both FIGS. 1 and 2, a method is initiated at block 202, where a system such as system 102 detects a program being presented on a television. In various implementations described herein, the program may be delivered to television 104 by any suitable means. For example, the program may be sourced by a cable network, streaming from a video platform (e.g., YouTube, etc.), from a traditional television broadcast station, etc.

At block 204, the system determines content of the program, where the content is displayed on the screen of the television. In various implementations, the system may determine the content of the program displayed on the television by analyzing the incoming signal. In various implementations, the content may include shapes, textures, and colors. The system may use any suitable image recognition techniques to identify various content of the program.

In various implementations, the system also determines the location of the colors on the screen. For example, the location may be pixel locations. As shown in FIG. 1, the system casts light onto the wall based on the locations of the colors on the screen. In other words, the relative positions of the colors on the wall correspond to the relative positions on the screen.

At block 206, the system displays light on a wall behind the television based on the content being presented. For example, in various implementations, the system displays the light on the wall behind the television based on color attributes associated with the content being presented on the screen of the television.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

In various implementations, the system controls a light grid with sufficient controlled light points to create a detailed light pattern appearing to extend the picture onto the walls behind the television. While FIG. 1 shows a simplified light pattern of three colors behind television 104, there may be any number of light colors. Also, in various implementations, the system may aim particular light rays in different directions. This enables the system to cast light on different areas of the wall.

In various implementations, the system may create detailed patterns using artificial intelligence techniques to extend more detailed images onto one or more walls. For example, the system may display clouds on the ceiling or extend a wallpaper pattern. An example wallpaper pattern may be optionally blurry, and may mimic a subtle color field with many small projecting lights.

In various implementations, the system may adjust particular light rays to have different sized beam widths (e.g., focused, wide, anywhere in-between). This enables the system to cast light that matches general colors on the television screen. This may, for example, create an ambience of bias light that provides a mood in the room that matches the content on television 104. In some implementations, the system may cast various light patterns such as sunbursts, etc. The particular light patterns may vary and will depend on the particular implementation.

In various implementations, the varying beam width sizes also enables the system to cast light that matches more specific colors on the television screen. This also extends the content on the television screen beyond the television to the back wall and optionally other walls in the room. Accordingly, the system's generation of colored light and projecting light onto the wall creates a more immersive experience for the user.

While some implementations are described in the context of the system casting light on the wall behind the television, as indicated herein, the system may display light on multiple walls surrounding the television. For example, the system may cause light to be cast on the wall behind the television and on the walls to the side of the television, or any combination thereof. In some implementations, as indicated herein, there may be lights on top of the television that cast light onto the ceiling.

In various implementations, the light being displayed on the wall originates from the rear of the television. This generally results in light being cast on the wall behind the television. As indicated herein, the light being displayed may also originate from the sides of the television. This generally results in light being cast on the walls to the side of the television. As indicated herein, the light being displayed may also originate from the top of the television. This generally results in light being cast on the ceiling of the television. As a result, the light displayed on the wall expands the visual experience of the user while the user watches the program.

In various implementations, the system detects other lights in a room in which the television is presenting the program. For example, there may be an overhead light in the room. There may also be standing lamps, scones, etc. in the room. The system displays the light on the wall behind the television based at least in part on the other lights in the room. For example, if the other lights in the room are bright, the system may increase the brightness of the lights emitted by the television. They may enable the lights emanating from the television to sufficiently stand out. The light on the wall also provides bias lighting that assists in the content on the television screen in standing out.

Smart lighting throughout the room continues the lighting from the television by knowing where in the room the lights are located, and intelligently calibrating the lights.

In some implementations, the television provides a lighting system that may be used for relaxation or in a sensory room to help emotionally and cognitively. For example, the system may display lights in the room that help users to be calm and/or engaged. In various implementations, the system presents one or more audio sounds associated with the light being displayed on the wall. For example, if the television is displaying colors or patterns or images on the television screen, the system may provide audio sounds with the light. If the light pattern is simpler, the audio sound may be simple sounds or music, for example. If the light pattern is lively, the audio sound may be lively sounds or music.

As indicated herein, in various implementations, the system may use artificial intelligence and machine learning techniques to perform operations associated with implementations described herein. In various implementations, the system may use a machine learning model to implement various artificial intelligence and machine learning techniques.

In various implementations, the system may use a set of collected data for a training set to create and train the machine learning model. The training set may include known data patterns and sequences, and known outcomes. The system repeatedly evaluates the machine learning model, which generates predictions based on collected data, and adjusts outcomes based upon the accuracy of the predictions. In some implementations, the machine learning model may learn through training by comparing predictions to known outcomes. As training progresses, the predictions of the machine learning model become increasingly accurate. In various implementations, the machine learning model may be based on various classification methods for time series analysis models such as random forest (RF), naïve model, exponential smoothing Model, autoregressive moving average (ARIMA), seasonal autoregressive moving average (SARIMA), linear regression, etc. In some implementations, the machine learning model may be based on machine learning methods such as multi-layer perceptron, recurrent neural network, and/or long short-term memory, etc. In various implementations, once training and setup are complete and evaluations become satisfactory, the machine learning model may function as a decision engine that can render determinations and decisions used by the system for carrying out implementations described herein.

Implementations described herein provide various benefits. For example, implementations described herein expand the visual experience of the user beyond the frame of the television to one or more walls or the ceiling surrounding the television while the user watches the program.

Figure 3:
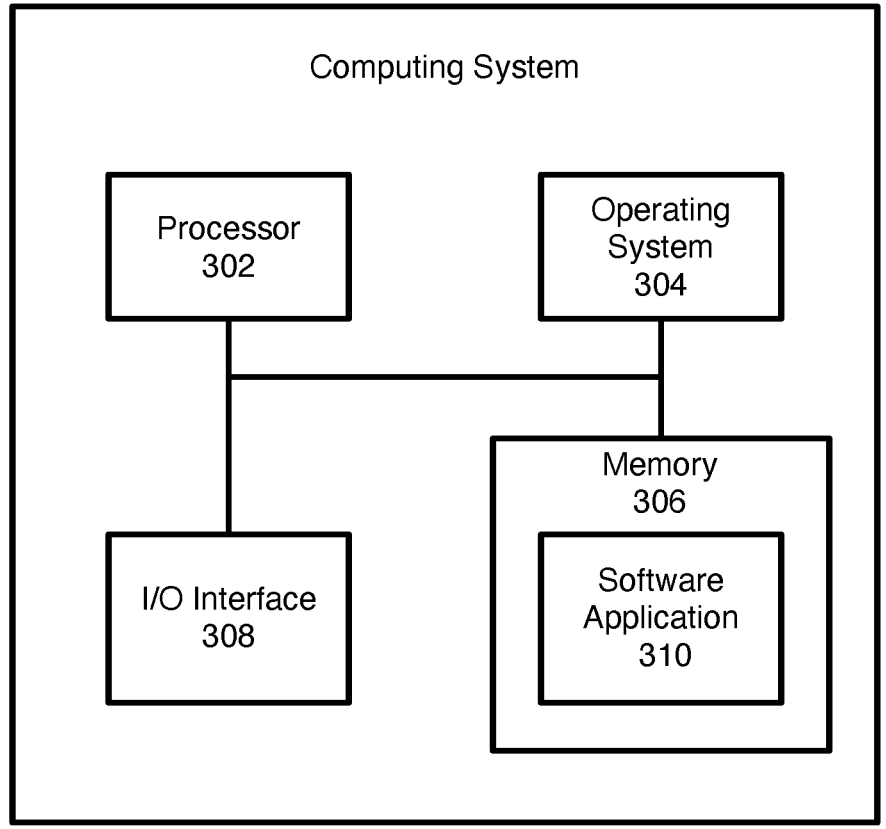
FIG. 3 is a block diagram of an example computer system, which may be used for some implementations described herein.

FIG. 3 is a block diagram of an example computer system 300, which may be used for some implementations described herein. For example, computer system 300 may be used to implement system 102 of FIG. 1, as well as to perform implementations described herein. In some implementations, computer system 300 may include a processor 302, an operating system 304, a memory 306, and an input/output (I/O) interface 308. In various implementations, processor 302 may be used to implement various functions and features described herein, as well as to perform the method implementations described herein. While processor 302 is described as performing implementations described herein, any suitable component or combination of components of computer system 300 or any suitable processor or processors associated with computer system 300 or any suitable system may perform the steps described. Implementations described herein may be carried out on a user device, on a server, or a combination of both.

Computer system 300 also includes a software application 310, which may be stored on memory 306 or on any other suitable storage location or computer-readable medium. Software application 310 provides instructions that enable processor 302 to perform the implementations described herein and other functions. Software application may also include an engine such as a network engine for performing various functions associated with one or more networks and network communications. The components of computer system 300 may be implemented by one or more processors or any combination of hardware devices, as well as any combination of hardware, software, firmware, etc.

For ease of illustration, FIG. 3 shows one block for each of processor 302, operating system 304, memory 306, I/O interface 308, and software application 310. These blocks 302, 304, 306, 308, and 310 may represent multiple processors, operating systems, memories, I/O interfaces, and software applications. In various implementations, computer system 300 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C #, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:

one or more processors; and logic encoded in one or more non-transitory computer-readable storage media for execution by the one or more processors and when executed operable to cause the one or more processors to perform operations comprising:

detecting a program being presented on a television;

determining content of the program, wherein the content is displayed on a screen of the television;

displaying light on a wall behind the television based on the content being presented; and presenting one or more audio sounds based on the light being displayed on the wall.

2. The system of claim 1, wherein the content comprises colors.

3. The system of claim 1, wherein the logic when executed is further operable to cause the one or more processors to perform operations comprising displaying light on a plurality of walls surrounding the television.

4. The system of claim 1, wherein the light being displayed on the wall originates from a rear of the television.

5. The system of claim 1, wherein the light displayed on the wall expands a visual experience of a user while the user watches the program.

6. The system of claim 1, wherein the logic when executed is further operable to cause the one or more processors to perform operations comprising:

detecting other lights in a room in which the television is presenting the program; and displaying the light on the wall behind the television based at least in part on the other lights in the room.

7. A non-transitory computer-readable storage medium with program instructions stored thereon, the program instructions when executed by one or more processors are operable to cause the one or more processors to perform operations comprising:

detecting a program being presented on a television;

determining content of the program, wherein the content is displayed on a screen of the television;

displaying light on a wall behind the television based on the content being presented; and presenting one or more audio sounds based on the light being displayed on the wall.

8. The non-transitory computer-readable storage medium of claim 7, wherein the content comprises colors.

9. The non-transitory computer-readable storage medium of claim 7, wherein the instructions when executed are further operable to cause the one or more processors to perform operations comprising displaying light on a plurality of walls surrounding the television.

10. The non-transitory computer-readable storage medium of claim 7, wherein the light being displayed on the wall originates from a rear of the television.

11. The non-transitory computer-readable storage medium of claim 7, wherein the light displayed on the wall expands a visual experience of a user while the user watches the program.

12. The non-transitory computer-readable storage medium of claim 7, wherein the instructions when executed are further operable to cause the one or more processors to perform operations comprising:

detecting other lights in a room in which the television is presenting the program; and displaying the light on the wall behind the television based at least in part on the other lights in the room.

13. A computer-implemented method comprising:

detecting a program being presented on a television;

determining content of the program, wherein the content is displayed on a screen of the television;

displaying light on a wall behind the television based on the content being presented; and presenting one or more audio sounds based on the light being displayed on the wall.

14. The method of claim 13, wherein the content comprises colors.

15. The method of claim 13, further comprising displaying light on a plurality of walls surrounding the television.

16. The method of claim 13, wherein the light being displayed on the wall originates from a rear of the television.

17. The method of claim 13, wherein the light displayed on the wall expands a visual experience of a user while the user watches the program.

18. The method of claim 13, further comprising:

detecting other lights in a room in which the television is presenting the program; and displaying the light on the wall behind the television based at least in part on the other lights in the room.

* * * * *